SYSTEM FOR CONVERTING TWO-LEVEL SIGNAL TO THREE-BIT-CODED DIGITAL SIGNAL

Filed Sept. 8, 1965 6 Sheets-Sheet 1

INVENTORS S. B. PFEIFFER
R. E. YAEGER
BY Leonard A. Arnold
ATTORNEY

July 23, 1968 S. B. PFEIFFER ET AL 3,394,312

SYSTEM FOR CONVERTING TWO-LEVEL SIGNAL TO THREE-BIT-CODED DIGITAL SIGNAL

Filed Sept. 8, 1965 6 Sheets-Sheet 4

July 23, 1968 S. B. PFEIFFER ET AL 3,394,312

SYSTEM FOR CONVERTING TWO-LEVEL SIGNAL TO THREE-BIT-CODED DIGITAL SIGNAL

Filed Sept. 8, 1965 6 Sheets-Sheet 6

United States Patent Office 3,394,312
Patented July 23, 1968

3,394,312
SYSTEM FOR CONVERTING TWO-LEVEL SIGNAL TO THREE-BIT-CODED DIGITAL SIGNAL

Sigmund B. Pfeiffer, Andover, and Robert E. Yaeger, Topsfield, Mass., assignors to Bell Telephone Laboratories Incorporated, New York, N.Y., a corporation of New York Filed Sept. 8, 1965, Ser. No. 485,769
6 Claims. (Cl. 325—38)

This invention relates to the encoding and decoding of two level signals and more particularly to the encoding and decoding of two level signals for transmission over a digital transmission system.

Two level signals, whether they be asynchronous serial data, synchronous serial data or a facsimile signal, may be transmitted over a digital transmission system by first allocating predetermined time slots of that system to such transmission and then transmitting a pulse in the next one of such time slots following a transition in the input signal. There are, however, two disadvantages to such a system. The first is a so-called variation in delay or time quantization error which is due to the fact that it is impossible for the receiving apparatus to ascertain where in the time interval between time slots allocated to such transmission a transition from one state to the other occurred in the input signal. A second difficulty with such a simple system is a directional ambiguity which is due to the fact that there is no signal transmitted to indicate the direction of the transition. Thus, initially the output of the receiver would have to match the input signal at the transmitter before commencing transmission. In addition, a line error would cause a transition to be missed or a false one to be made and the receiver would then be out of step until another error occurs.

The directional ambiguity of the previously described system can be overcome by employing a two digit signal for each transition. The first digit, which might be designated either an address digit or a transition digit, is employed to indicate to the receiving apparatus that a transition has occurred. The second digit is employed to indicate to the receiving apparatus the direction of the transition. The address digit is transmitted in the first time slot allocated to the transmission of the two level signal information following a transition, while the second digit, which may be called a direction digit, is transmitted in the second such time slot following a transition.

Although the two digit signal system overcomes the directional ambiguity of the previously described system, it does not overcome the variation in delay or time quantization error which may occur between the input and output signals. Again, this problem is due to the fact that it is impossible for the receiving apparatus to ascertain when in the interval between time slots allocated to the transmission of two level signal information a transition occurs. This time quantization error or variation in delay might be reduced to one-half its original value by doubling the number of time slots allocated to the transmission of the two level signal information. Although the maximum time quantization error is still the time interval between time slots the time between such time slots is one-half that which previously existed. This improvement, however, has been carried out at the expense of utilizing twice the number of time slots of the digital transmission system for transmitting the two level signal information.

An object of this invention is to increase the sampling rate without requiring a proportional increase in the rate of transmission of information.

It is a particular object of this invention, therefore, to halve the variation in delay or time quantization error associated with the encoding of two level signals for transmission over a digital transmission system without the necessity of doubling the number of time slots allocated to the transmission of two level signal information.

In accordance with this invention, each transition of a two level input signal is encoded into a three digit transition code word with the first digit acting as an address or transition bit to signal to the receiving terminal that a transition has taken place, the second digit acting as a timing signal to indicate the time at which the transition occurred and the third digit acting as a direction bit to signal the direction of the transition.

More specifically, the encoder is controlled by a train of primary pulses, designated $\varphi_M$ pulses, from a clock occurring at the rate at which digits are to be transmitted over the digital transmission facility. The digits of the code word are transmitted at the rate of these primary pulses. In order that the signal may be sampled at twice the rate of the primary pulses there is employed a train of secondary pulses, designated $\varphi_T$ pulses, of the same rate as the primary pulses but halfway therebetween. The two level signal is sampled by combining the two pulse trains. When the sampling process detects a transition in the signal a pulse is transmitted as the first digit of the code word. As discussed, the second digit will transmit information with respect to the sampling time in which a transition was detected. For the purpose of explanation, an early transition is defined as one that is detected by a primary pulse and a late transition is one that is detected by a secondary pulse. The condition of early or late transitions is transmitted by the state of the second digit of the transition code word. A "1" digit (mark) indicates an early transition and a "0" digit (space) indicates a late transition. Thus, the second digit of the code word serves to give information with respect to sampling of the signal at twice the bit rate of the transmission facility.

The signal present in the third time slot of the three bit transition code word depends upon the nature of the transition in the two level signal. Consider, for example, the facsimile signal which is one of the class of two level signals. In a facsimile system those signals developed in scanning an image whose amplitudes exceed an arbitrary threshold are transmitted as signals of a first state and those signals whose amplitudes fail to exceed that threshold are transmitted as signals of a second state. When a transition is from white to black it is signaled to the receiving apparatus by the presence of a pulse in the third bit of the transition code word. Conversely, a transition from black to white is indicated by the absence of a pulse (space) in the third bit. The receiving apparatus in response to the reception of these transition code words reproduces the input signal with a time quantization error no greater than one-half the time interval between the primary pulses. This reduction in the time quantization error has been achieved without the necessity of doubling the number of time slots of the digital transmission system allocated to the transmission of two level signal information.

This invention will be more fully comprehended from the following detailed description taken in conjunction with the drawings in which.

Figure 1:
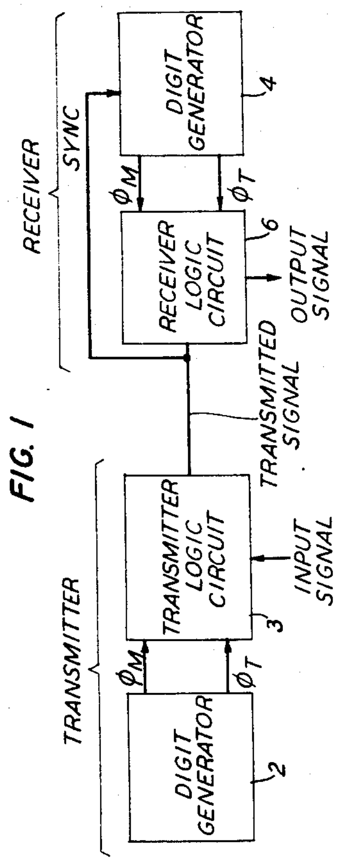
FIG. 1 is a simplified block diagram of a transmission system embodying this invention.
Figure 2:
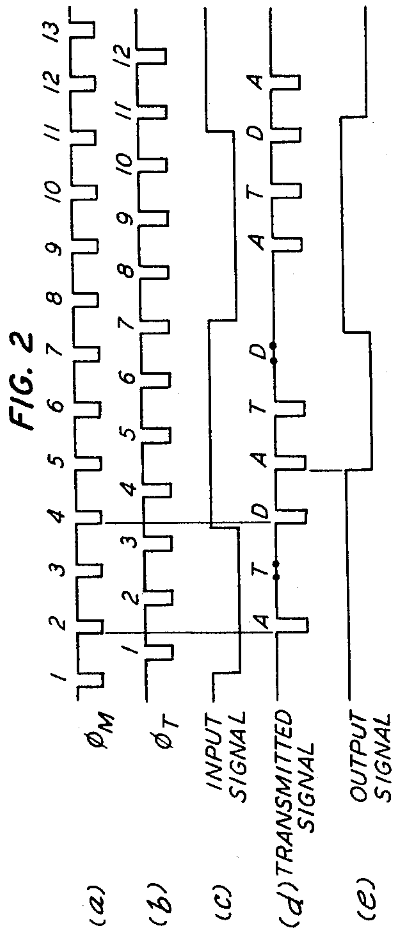
FIG. 2 is a series of signal wave forms useful in understanding the principles of this invention.

To aid in the understanding of the invention, a simplified block diagram of a transmission system embodying this invention is shown in FIG. 1 with signals found in various portions of that circuit illustrated in FIG. 2. The transmitter comprises essentially a digit generator 2 and a transmitter logic circuit 3. The function of the digit generator 2 is to generate the $\varphi_M$ pulses which occur during each time slot allocated to the transmission of information from a two level signal source such as a source of facsimile signals. The digit generator also generates the $\varphi_T$ pulses, each of which is located midway in time between the $\varphi_M$ pulses so that they serve to divide the interval between each $\varphi_M$ pulse and its succeeding pulse in half. The $\varphi_M$ and $\varphi_T$ signals are shown in lines *a* and *b* of FIG. 2, respectively. The two level input signal, which may be a facsimile signal, is shown in line *c* of FIG. 2 and the first illustrated transition therein is a white-to-black transition occurring in the interval between the first $\varphi_M$ pulse and the first $\varphi_T$ pulse. A transition occurring between a primary $\varphi_M$ pulse and the immediately succeeding secondary $\varphi_T$ pulse is detected by the $\varphi_T$ pulse and is a late transition so that no $\varphi_M$ pulse is generated during the second time slot of the three digit transition code word. The transmitter logic circuit 3 functions to generate the transmitted signal, which is shown in line *d* of FIG. 2. For the first illustrated transition, the transmitted signal is a $\varphi_M$ pulse transmitted during the second illustrated time slot of the $\varphi_M$ signal, a space in the third $\varphi_M$ time slot and a pulse in the fourth $\varphi_M$ time slot, the latter indicating a transition to black.

The second illustrated transition in the two input signal is a transition which occurs in the time interval between the third $\varphi_T$ time slot and the fourth $\varphi_M$ time slot. The occurrence of such a transition is detected by a primary pulse and as defined above is an early transition which is signaled by transmitting a $\varphi_M$ marking pulse during the second bit of the third bit transition code word. Since the transition is from black to white, a space, or the absence of a pulse, is transmitted in the third bit of the transition code word. The resulting signal, generated by the transmitter logic circuit 3, occurs in the fifth, sixth, and seventh $\varphi_M$ time slots and is shown in line *d* of FIG. 2. A third transition which is an early transition to black is also illustrated in FIG. 2.

The receiving apparatus comprises a digit generator 4, which generates $\varphi_M$ and $\varphi_T$ pulses and is synchronized to the digit generator 3 at the transmitting terminal, and a receiver logic circuit 6. Together they function to reproduce the two level signal. The receiver, upon receiving an address or transition bit in the first time slot of a transition code word, hesitates until the entire three bit transition code word is received before setting the output signal to either the black or the white level. If the transition was a late one, such as is the case with the first illustrated transition, the receiver logic circuit waits until the occurrence of the next $\varphi_M$ pulse following the third bit of the transition code word until it sets the output signal to the proper level. On the other hand, if the transition was an early transition, such as the second illustrated transition, the receiver sets the output signal to the proper level upon the occurrence of the $\varphi_T$ pulse which occurs immediately after the third bit of the transition code word. As a result, the time quantization error is limited to a maximum period of one-half the time interval between $\varphi_M$ pulses. This is the same error which would exist if the pulse repetition rate of the $\varphi_M$ pulse train had been doubled with twice the number of time slots of the digital transmission system being used to transmit the two level signal information.

Depending upon the speed of the two level signal to be sent, different pulse repetition rates for $\varphi_M$ and $\varphi_T$ pulse signals are used. To generate the $\varphi_M$ and $\varphi_T$ pulses, use may be made of the digit generator usually found at each terminal of a pulse transmission system. For example, in the pulse transmission system described in the January 1962 issue of the Bell System Technical Journal by C. G. Davis in "An Experimental Pulse Code Modulation System for Short Haul Trunks," pp. 1–24, and by J. S. Mayo in "A Bipolar Repeater for Pulse Code Modulation Signals," pp. 25–97, a digit pulse generator is employed to insert the encoded voice signals and any signaling into the eight time slots which make up a channel. For this purpose, the digit generator generates eight marking pulses which sequentially appear on each of eight output terminals D1 through D8 during the eight time slots of each channel in each frame of the transmission line.

Figure 4:
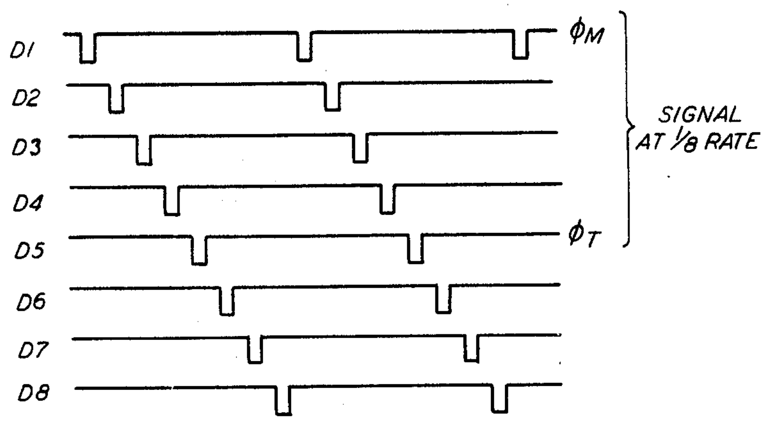
FIG. 4 illustrates the composition of the $\varphi_M$ and $\varphi_T$ signals for a signal requiring one-eighth the transmission space of the digital transmission system.
Figure 5:
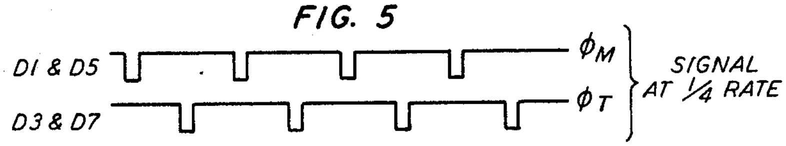
FIG. 5 illustrates the composition of the $\varphi_M$ and $\varphi_T$ signals for a signal requiring one-quarter the transmission space of the digital transmission system.

Where, for example, a two level signal having one-eighth the capacity of the transmission system discussed in the above-mentioned articles is to be transmitted, then the D1 output of the digit generator is used as the $\varphi_M$ pulse train and the D5 output is used for the $\varphi_T$ pulse train. Such an allocation of transmission space is designated as an eighth rate channel because the frequency bandwidth is one-eighth the bandwidth of the transmission system. The resulting $\varphi_M$ and $\varphi_T$ signals together with the output signals of the digit generator are shown in FIG. 4.

Where the speed of the two level signal is such it requires one-quarter of the available bandwidth of the digital transmission system, then the $\varphi_T$ signals ars most easily obtained by connecting the D1 and D5 output terminals of the digit generator to the input terminals of an OR gate and designating the output of that OR gate as the $\varphi_M$ signal. The $\varphi_T$ signal is obtained by connecting the D3 and D7 output terminals of the digit generator to the input terminals of a second OR gate whose output signal is the $\varphi_T$ signal. The resulting $\varphi_T$ signal, together with the $\varphi_M$ signal, are shown in FIG. 5.

Figure 6:
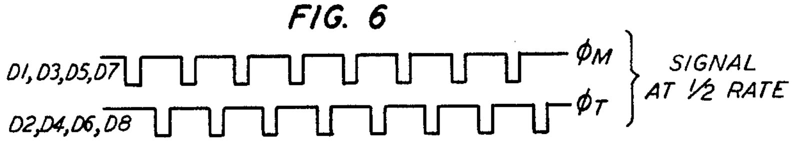
FIG. 6 illustrates the composition of the $\varphi_M$ and $\varphi_T$ signals for a signal requiring one-half the transmission space of the digital transmission system.

Similarly, for a one-half rate channel the $\varphi_M$ signal is obtained by connecting the D1, D3, D5, and D7 output terminals of the digit generator to the input terminals of an OR gate at whose output terminal the $\varphi_M$ signal is obtained, while the $\varphi_T$ signal is obtained by connecting the D2, D4, D6, and D8 output terminals to the input terminals of a second OR gate. The resulting signals are shown in FIG. 6.

Figure 7:
FIG. 7 illustrates the composition of the $\varphi_M$ signal for a dedicated digital transmission system.

Finally, where the entire transmission system is allocated to the transmission of data from a single source, the $\varphi_M$ signal is obtained from the output terminal of an OR gate to whose input terminals are connected the D1 through D8 output terminals of the digit generator while the $\varphi_T$ signal is obtained by merely inverting the output of this OR gate. This situation is depicted in FIG. 7.

Figure 3:
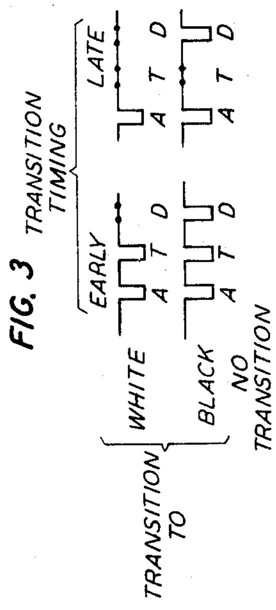
FIG. 3 illustrates the various possible transition code words.

Thus, to recapitulate, signals are transmitted over the digital transmission system only during the presence of a $\varphi_M$ pulse, the $\varphi_T$ pulses being used only for timing purposes. Upon a signal transition, a first $\varphi_M$ pulse is transmitted to act as an address or transition bit. In the next occurring $\varphi_M$ time slot a second $\varphi_M$ marking pulse is transmitted if the transition occurred between a $\varphi_T$ marking pulse and the next occurring $\varphi_M$ marking pulse, while no $\varphi_M$ marking pulse will be transmitted if the transition occurred between a $\varphi_M$ marking pulse and the next occurring $\varphi_T$ marking pulse. Thus, the $\varphi_T$ pulse train has the effect of quantizing the time interval between $\varphi_M$ pulses. Finally, the third bit of the transition code word indicates the direction of the transition, a space indicating a transition to white, a mark indicating a transition to black. The four possible transition code words are show in FIG. 3.

Figure 8:
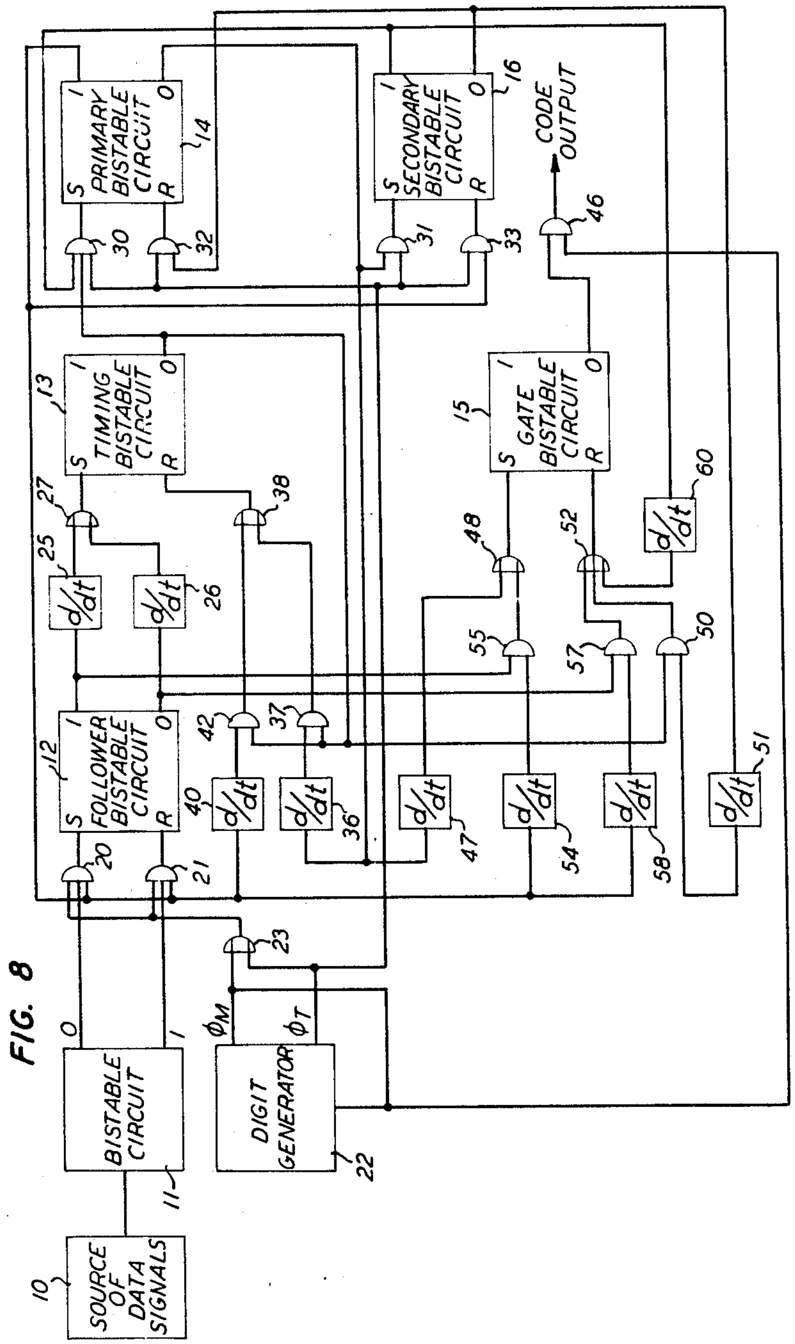
FIG. 8 is a block diagram of a coder embodying this invention.
Figure 9:
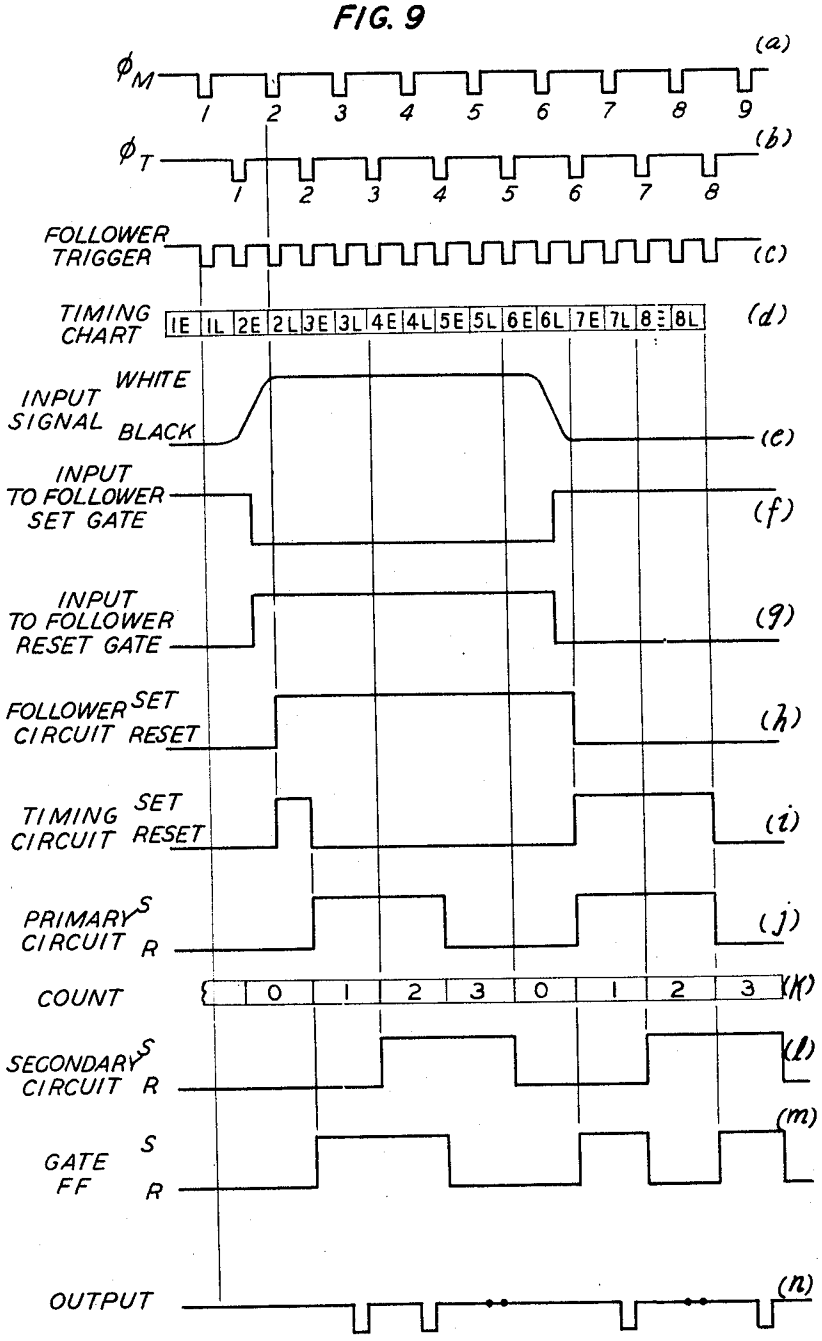
FIG. 9 illustrates wave forms found at various points of the apparatus shown in FIG. 8.

A block diagram of the transmitting apparatus embodying this invention which is used to generate the transition code words is shown in FIG. 8. FIG. 9 illustrates signal wave forms at various points in the circuitry of FIG. 8 which are useful in explaining the operation of the transmitting apparatus. The $\varphi_M$ and $\varphi_T$ signals are shown in lines *a* and *b* of FIG. 9, and a timing graph is shown in line *d*. Particular note should be taken of the manner in which the $\varphi_T$ pulses serve to divide the time intervals between $\varphi_M$ pulses into two equal parts as discussed above. In the timing graph shown in line *d* of FIG. 9 these half intervals are numbered in numerical order together with the letters E and L where E means an early transition and L means a late transition, as defined above. Thus, for example, a transition occurring in the 2L interval of the timing chart means that the transition has occurred between the second and third illustrated $\varphi_M$ pulses. Much of the apparatus shown in FIG. 8, to be described below, is concerned with determining when a transition occurred and producing a mark or a space as the second bit of the three bit code word in accordance with that determination.

The signals to be transmitted are derived from a source 10 and are of a type that may be described as two level in which the information carried is determined by the signal level and the time of transition from one level to the other. Typical of such two level signals are serial binary data, either synchronous or asynchronous and black and white facsimile signals. For the purpose of describing the invention the transmission of such a facsimile signal will be described. For this purpose there is illustrated in line *c* of FIG. 9 a two level facsimile signal. The facsimile signal is applied from source 10 to a bistable circuit 11 so that when the analog signal is above a predetermined level the bistable circuit is in a first state and when it is below that level it is in its second state. The first state may be designated as the set condition and the second state as the reset condition. Two output terminals are provided from the bistable circuit 11. When the bistable circuit is in the set condition a reference voltage appears at its "1" output terminal and a negative voltage at its "0" output terminal. Conversely, when the bistable circuit 11 is in the reset condition, a negative voltage appears at its "1" output terminal and a reference voltage at its "0" output terminal.

The transmitting logic circuitry shown in FIG. 8 comprises five additional bistable circuits together with associated logic circuitry. These additional bistable circuits are designated the follower circuit 12, timing circuit 13, primary circuit 14, gate circuit 15, and secondary circuit 16. Each has set S and reset R input terminals and "1" and "0" output terminals. When triggered to the set condition by an appropriate input voltage at its set input terminal, each of the bistable circuits produces a reference voltage at its "1" output terminal and a negative voltage at its "0" output terminal. Conversely, when triggered to its reset condition by an appropriate input voltage applied to its reset input terminal a negative voltage is present at the "1" output terminal and a reference voltage at the "0" output terminal.

In general the function of the follower, timing, primary and secondary circuits is to control the gate circuit 15 to the end that each bit of the transition code word is properly determined. To this end the facsimile signal at the output of bistable circuit 11 is sampled and applied to follower circuit 12 which stores the signal level until the next sampling time. In the absence of transitions in the signal the signal is sampled at twice the bit rate of the code word. When a transition occurs the follower 12 must hold its store during the generation of the code word so that it is necessary to temporarily interrupt the sampling process.

The timing circuit 13 indicates transitions and their time, i.e., whether they were detected by early or late sampling pulses. It passes the resulting information to the gate circuit 15 which controls the transmission of an address bit in response to a transition and determines the state of the second bit of the transition code word depending on the sampling time at which the transition was detected.

The primary circuit 14 and secondary circuit 15 constitute a two stage counter which times the operation of the circuit including the timing of the bits of the transition code words. In particular, the counter times the transmission of information to the gate circuit 15 for control of the generation of the respective bits of the code word. The manner in which these various functions are performed will be described in detail below.

The "0" output terminal of bistable circuit 11 is connected to one input terminal of an AND gate 20 and the "1" output terminal of bistable circuit 11 is connected to one input terminal of AND gate 21. AND gates 20 and 21 are enabled by negative pulses or the negative step output voltage of primary bistable circuit 14. Initially, the primary circuit 14 is in the reset condition and a negative output voltage is applied from its "1" output terminal to a second input terminal of each of AND gates 20 and 21. When the primary circuit 14 is set there will be no negative voltage on its "1" output terminal and the gates 20 and 21 will be inhibited. The primary circuit 14 is in the set condition during the counts "1" and "2" of the two-stage counter, as will appear from the later discussion. Consequently, the output of source 10 cannot be sampled during these counts which correspond to the times of the first two pulses of the transition code word.

Under this initial condition AND gates 20 and 21 are enabled during the occurrence of either a $\varphi_M$ or a $\varphi_T$ pulse since the $\varphi_M$ and $\varphi_T$ pulses generated by digit generator circuit 22 are applied through OR gate 23 to a third input terminal of each of these AND gates. The output signal from OR gate 23 is shown in line *c* of FIG. 9. As a result, the follower circuit 12 is triggered to the set or reset condition, depending upon the state or level of the input signal. As shown in line *f* of FIG. 9, whenever the input signal makes a transition, the follower circuit 12 makes a similar transition during the occurrence of the next $\varphi_M$ or $\varphi_T$ pulses. In particular, the facsimile signal goes from black to white, the follower circuit 12 is set by the next occurring $\varphi_M$ or $\varphi_T$ pulse since enabled AND gate 20 produces an output signal in response to the negative step output signal at the "0" output terminal of bistable circuit 11. Similarly, when the analog signal goes from white to black, the follower circuit 12 is reset during the next occurring $\varphi_M$ or $\varphi_T$ pulse since enabled AND gate 21 produces an output signal in response to the negative step output signal at the "1" output terminal of bistable circuit 11. The input signal to the set terminal of follower circuit 12 is shown in line *f* of FIG. 9, the input signal to the reset terminal is shown in line *g* of FIG. 9, and the output state of follower circuit 12 is shown in line *h* of FIG. 9.

In effect, the two level facsimile signal at the output terminals of bistable circuit 11 is sampled by the gates 20 and 21 by the sampling pulses shown in line *c* of FIG. 9 and the resulting samples are stored in the follower circuit 12.

The "1" and "0" outputs of the follower circuit 12 are connected to the set terminal of the timing circuit 13 so that the timing circuit 13 is triggered into the set state each time a transition occurs in the state of the follower circuit 12. The setting of the timing circuit 13 therefore marks a transition in the two level signal.

In somewhat more detail, the "1" and "0" terminals of follower circuit 12 are connected by means of differentiating circuits 25 and 26, respectively, to the input terminals of OR gate 27. As a result, whenever a transition occcurs in either output of follower circuit 12, OR gate 27 produces an output signal which is applied to the set terminal of timing circuit 13 so that whenever the follower circuit 12 has a transition in its state, the timing circuit is triggered to set the condition. The state of the timing circuit 13 is shown in line *i* of FIG. 9.

For the purposes of controlling generation of the three bit transition code word, a four state counter is provided, consisting of the primary circuit 14 and secondary circuit 16. Initially, i.e., in the periods of no transition in the two level signal, both the primary 14 and secondary 16 are in the reset condition and the counter is said to have a "0" count. The count of the counter is shown in line *k* of FIG. 9 while the states of the primary 14 and secondary 16 which determine the count are shown in lines *j* and *l*, respectively.

The count remains at "0" until the timing circuit 13 is set due to a transition in the output of the follower circuit 12, at which time the four-stage counter is advanced by using $\varphi_T$ pulses to trigger the primary 14 and secondary 16. The first $\varphi_T$ pulse occurring when or after the timing circuit is set, passes through AND gate 30 to set the primary circuit 14 and thereby advance the counter to a count of "1," as indicated in line *k* of FIG. 9. The gating conditions imposed upon the AND gate 30 whose output is connected to the set terminal of primary circuit 14, are such that the AND gate 30 is enabled when the timing circuit 13 is in the set condition and simultaneously the secondary circuit 16 is in the reset condition. These conditions are present only when the count of the counter is "0." For this purpose, input terminals of AND gate 30 are connected to the "0" terminal of timing circuit 13 and the "1" terminal of secondary circuit 16.

The next $\varphi_T$ pulse sets the secondary circuit 16 by passing through AND gate 31 which is enabled when the primary circuit 14 is in the set state by virtue of the connection to the gate 31 from the "0" terminal and the primary circuit 14. Now the primary circuit 14 and the secondary circuit 16 are both in the set state and the counter advanced to a count of two.

The next $\varphi_T$ pulse triggers AND gate 32 at the reset terminal of the primary circuit 14, which is enabled when the secondary circuit 16 is in the set condition by virtue of the connection to AND gate 32 from the "0" terminal of secondary circuit 16. The counter is now advanced to a count of three.

Finally, the next $\varphi_T$ pulse returns the counter to "0." For this purpose, the $\varphi_T$ pulse triggers AND gate 33 at the reset terminal of secondary circuit 16 which is enabled when the primary circuit 14 is in the reset state. This is the condition corresponding to a count of "0." The relationhip between the states of the primary circuit 14 and the secondary circuit 16 and the count of the counter are illustrated in lines *j*, *k*, and *l* of FIG. 9.

The counter circuitry comprising the primary 14 and secondary 16 has four output terminals. They are the "1" and "0" outputs of the primary 14 and secondary 16. The signals obtained at these output terminals and the signals derived from the follower circuit 12 and the timing circuit 13 are used in generating the three bit code word for each transition. As defined above, a signal transition is early if it occurs during the first half of the interval between the leading edges of the $\varphi_T$ pulses and it is late if it occurs during the second half of this interval. When the transition is early the follower circuit 12 is triggered and the timing circuit 13 set coincidentally by a $\varphi_M$ pulse. If, however, the transition is late, the follower circuit 12 is triggered and the timing circuit 13 will be set by the next occurring $\varphi_T$ pulse.

The timing circuit 13 functions to differentiate between an early transition and a late one. The manner in which this is done is by generating positive output voltages of different lengths in accordance with whether the transition is early or late. Briefly, the timing circuit 13 remains set for half a timing interval following each early transition, but it remains set for two timing intervals following each late transition. In this connection a timing interval is understood to mean the period of the $\varphi_M$ or $\varphi_T$ pulse stream, i.e., the time between $\varphi_M$ pulses or $\varphi_T$ marking pulses.

The first transition in the input signal, shown in line *e* of FIG. 9 occurs during the 2E time interval. As a result of this transition, the follower circuit 12 is set by a $\varphi_M$ pulse and the timing circuit 13 is simultaneously set. The next occurring $\varphi_T$ pulse sets the primary circuit 14, as previously described. The "0" output terminal of primary circuit 14 is connected through a differentiating circuit 36 to one input of an AND gate 37 whose second input terminal is connected to the "0" terminal of timing circuit 13. This last connection enables gate 37 whenever the timing circuit 13 is in the set state. As a result, AND gate 37 responds to the setting of primary 14 to produce an output signal which is transmitted through OR gate 38 to the reset terminal of timing circuit 13 so that the timing circuit 13 is reset. Timing circuit 13 remains in the reset condition until another transition occurs.

The next transition in the input signal shown in line *e* of FIG. 9 is a transition to black occurring in the 6L time interval shown in line *d* of FIG. 9. As a result of this transition, the follower circuit 12 is reset by the leading edge of the next occurring $\varphi_T$ pulse, and the timing circuit 13 is simultaneously set which in turn enables AND gate 30 so that the $\varphi_T$ pulse causes that gate to generate an output signal and set the primary circuit 14. The timing circuit 13 is not reset until another transition occurs in the output of the primary circuit 14 since the initial setting of the primary circuit 14 and the simultaneous setting of the timing circuit 13 cannot act to reset the timing circuit 13. At the time the primary circuit 14 is reset, namely, at the time of occurrence of the third count of the counter, a negative output voltage is generated at its "1" output terminal which is applied to differentiating circuit 40 which produces a negative output pulse. The output terminal of differentiating circuit 40 is connected to one input terminal of an AND gate 42 whose second input terminal is connected to the "0" terminal of timing circuit 13. As a result, when the primary circuit 14 is reset during the occurrence of the third count of the counter, AND gate 42 is enabled and its output signal applied through OR gate 38 to reset the timing circuit 13.

The functions of the follower circuit 12, timing circuit 13 and the four-stage counter comprising primary circuit 14 and secondary circuit 16, whose operations have been described above, are to generate signals to control the gate circuit 15 which in turn controls the transmission of $\varphi_M$ output pulses shown in line *n* of FIG. 9 as the bits of the code word. The "0" terminal of the gate circuit 15 is connected to one input terminal of an AND gate 46 which will transmit a negative pulse when a negative step signal is present at the "0" terminal of gate circuit 15. Thus, when the gate circuit 15 is in the set condition AND gate 46 is enabled, but when gate circuit 15 is in the reset condition AND gate 46 is rendered nonconductive. The $\varphi_M$ pulses from the digit generator circuit 22 are applied to a second input terminal of AND gate 46 so that AND gate 46 transmits or inhibits negative going $\varphi_M$ marking pulses depending on the voltage at the "0" output terminal of gate circuit 15. The state of gate 15 is shown in line *m* of FIG. 9.

Signals to time the setting and resetting of the gate circuit 15 are derived from the counter output; namely the "0" and "1" terminals of the primary 14 and secondary 16 circuits. The "0" output terminal of primary circuit 14 is connected to a differentiator circuit 47 whose output is in turn connected to one input terminal of OR gate 48. The output terminal of OR gate 48 is connected to the set input terminal of gate circuit 15 so that whenever the primary circuit 14 is set the differentiated output from its "0" output terminal sets gate circuit 15 and the next occurring negative going $\varphi_M$ marking pulse is transmitted and represents the address or transition bit. This sequence of events occurs for every transition of the input signal.

The establishment of the other bits of the code word require not only timing from the output of the counter but also information concerning other conditions of the logic circuitry. Thus, when a late transition has occurred, the output signal at the "0" output terminal of the secondary circuit 16, together with the output signal at the "0" output terminal of the timing circuit 13, are used to reset the gate circuit 15 to prevent a negative going $\varphi_M$ pulse from being transmitted and a "0" will then occur as the second bit of the code transition word. This is effected by virtue of the fact that when such a late transition has occurred, the timing circuit 13 is in the set state when the secondary circuit 16 is set upon the counter reaching a count of 2. The "0" output terminal of the timing circuit 13 is connected to one input terminal of an AND gate 50, while the "0" output terminal of secondary circuit 16 is connected through a differentiator circuit 51 to a second input terminal of AND gate 50. Thus, AND gate 50 is rendered conductive by the two applied negative signals and produces an output signal which is transmitted through OR gate 52 to the reset terminal of gate circuit 15 to reset that circuit. As a result, a $\varphi_M$ pulse is inhibited and a "0" will occur as the second bit of the three bit code word sequence, as required.

In contrast, if the transition had been an early one, the timing circuit 13 would have been in the reset state at the time of occurrence of the transition of the secondary circuit 16 and AND gate 50 would have produced no output signal. The gate circuit 15 would then have remained in the set state and a negative going $\varphi_M$ pulse would have been transmitted to represent an early transition.

When the transition is one from white to black, the following sequence of operations takes place to produce a negative going $\varphi_M$ pulse as the third bit of the transition code word. The signal at the "1" output of the primary circuit 14 is differentiated by differentiator circuit 54 and applied to AND gate 55 at one input terminal. AND gate 55 is enabled by a negative voltage when the follower circuit 12 is in the reset state since a second input terminal is connected to the "1" output terminal of follower circuit 12. This condition exists only when the transition was from white to black. The resulting output signal from AND gate 55 is transmitted by OR gate 48 to set gate circuit 15 so that the next negative going $\varphi_M$ pulse is transmitted to represent a transition to black.

When a transition from black to white has occurred, a "0" will be required as the third bit of the transition code word. To accomplish this, the "1" output terminal of primary circuit 14 is connected to one input terminal of an AND gate 57 by means of a differentiator circuit 58. AND gate 57 is enabled by the negative voltage from the "0" terminal of the follower circuit 12 when it is in the set state. This condition exists for a transition to white. As a result, AND gate 57 produces an output signal which is transmitted through OR gate 52 to reset gate circuit 15 so that the next occurring negative going $\varphi_M$ pulse is inhibited.

Finally, the output signal at the "1" terminal of the secondary circuit 16 is differentiated by differentiator circuit 60, whose output is connected to one input terminal of OR gate 52. Secondary circuit 16 is reset when the count of the counter returns to "0" and if the gate circuit 15 was set to transmit a $\varphi_M$ pulse in the third bit of the transition code word, the resulting signal applied to its reset input terminal resets it and stops the transmission of $\varphi_M$ pulses since the transition code word is now complete.

Figure 10:
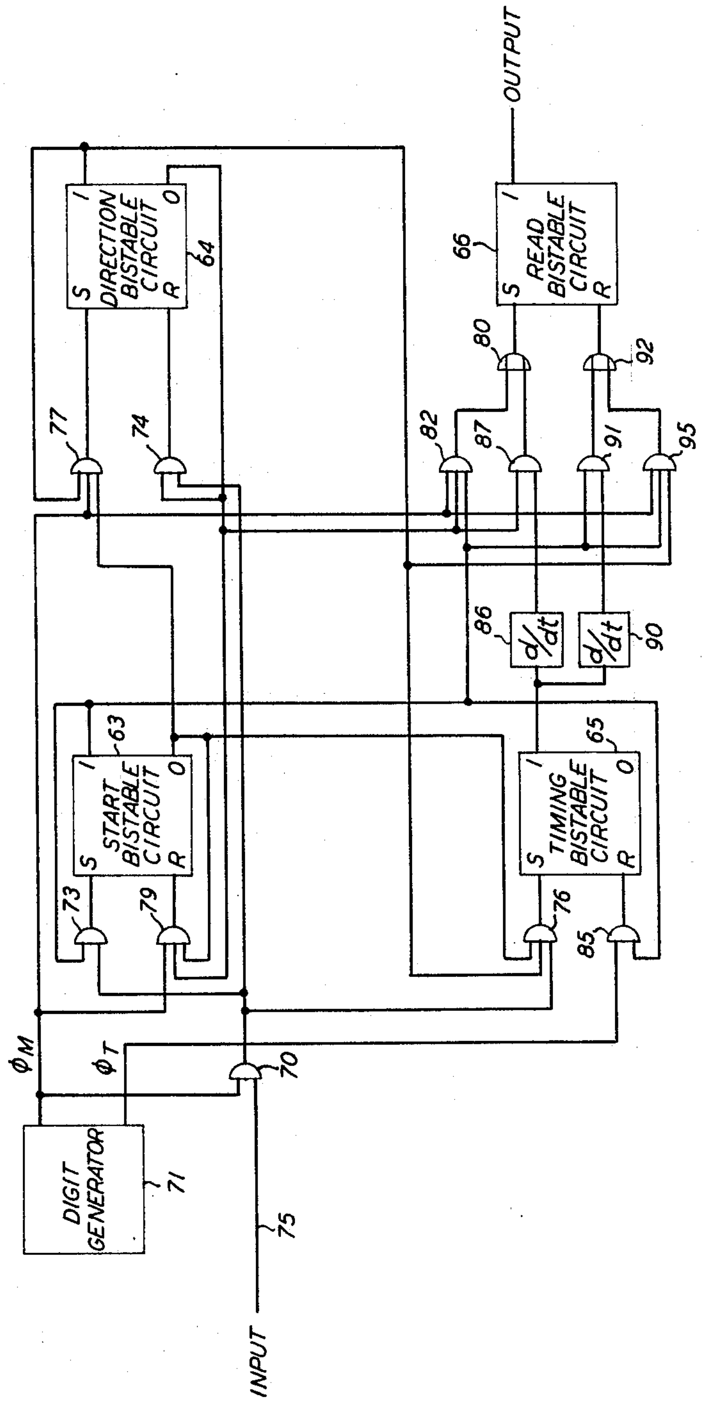
FIG. 10 is a block diagram of a decoder embodying this invention.

A block diagram of the receiving circuitry to convert the three bit transition code word back to the analog signal is shown in FIG. 10. This apparatus comprises four bistable circuits and associated logic circuitry. The bistable circuits are a so-called start circuit 63, direction circuit 64, timing circuit 65, and read circuit 66, and the output of this receiver circuitry is the "1" output terminal of the read circuit 66. The purpose of the start circuit 63, direction circuit 64, timing circuit 65, and the associated logic circuitry is to control the state of the read circuit 66 so that when a transition code word indicating a transition to white is received the read circuit 66 assumes the set state and when a transition code word indicating a transition to black is received the read circuit 66 assumes the reset state. For the purpose of timing, if the received transition code word represents an early transition, the read circuit 66 makes its transition one-half time interval after the direction digit is received. However, if the received code represents a late transition the read circuit 66 makes a corresponding transition at one full time interval after the direction digit is received. Again, a time interval is understood to be the period of the $\varphi_M$ and $\varphi_T$ pulse trains.

Figure 11:
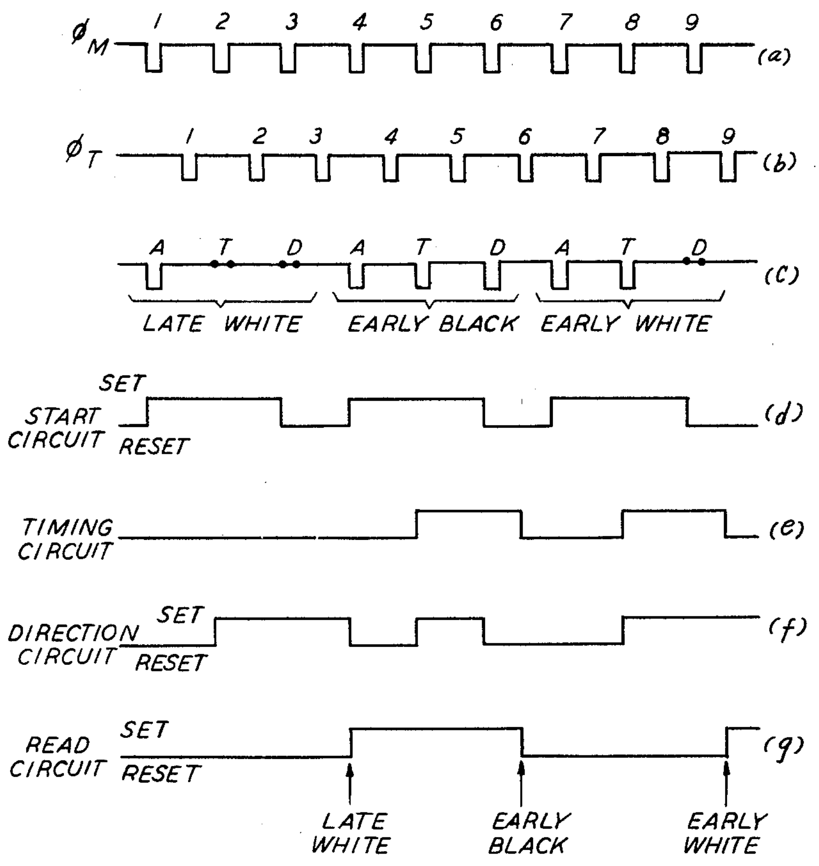
FIG. 11 is a series of wave forms showing the signals found at various points of the circuitry shown in FIG. 10.

An illustrative example of three transition code words is shown in line *c* of FIG. 11 and the states of the start circuit 63, timing circuit 65, direction circuit 64, and read circuit 66 are shown in lines *d* through *g*, respectively, of FIG. 11. The $\varphi_M$ and $\varphi_T$ pulses are shown in lines *a* and *b* of FIG. 11. Initially, the start circuit 63 and timing circuit 65 are in the reset state. The direction circuit 64 and the read circuit 66 are in the set or reset state depending on the direction of the last transition. If the last transition was a transition to white they are set but if the last transition was a transition to black they are reset.

The signals from the high speed digital transmission line 75 must be processed before they are suitable for operating the decoder or converter circuit just described in its over-all make-up. First, the digital code words to be decoded by the circuit 63–64–65–66 must be separated from the code words of other channels transmitted on line 75. For this purpose there is provided an AND gate 70 which serves as one channel gate of a receiving distributor. Lead 75 goes to similar gates for other channels. The selection of the desired pulses by the gate 70 is controlled by an array of $\varphi_M$ pulses from a digit generator 71. The array of negative going $\varphi_M$ pulses from generator 71 is identical to and synchronized with those in the output of generator 22 at the transmitter. Accordingly, the pulses supplied from generator 71 enable the AND gate 70 to pass the pulses of the three digit transition word required for the converter (decoder). As will appear from the later description, these $\varphi_M$ pulses, together with the phased $\varphi_T$ pulses, also perform certain timing functions in the operation of the decoder.

The start circuit 63 and the direction circuit 64 constitute a four-stage counter which controls gating circuitry to steer received code bits to the proper trigger circuits so that the timing circuit 65 and read circuit 66 function to produce the proper output. The first bit of each transition code word is, of course, the address or transition bit. This address bit appearing at the output terminal of AND gate 70 is applied to one input terminal of AND gate 73 whose output is connected to the set terminal of start circuit 63. At the beginning of a transition code word, the start circuit 63 is always in a reset condition and a negative output voltage appears at its "1" output terminal, which is connected to a second input terminal of AND gate 73 to enable it. As a result, the address pulse will cause start circuit 63 to assume the set state. The AND gate 73, with its pass or inhibit control signal from the "1" output of start circuit 63, are necessary because there are conditions in which trigger pulses appear simultaneously on the set and reset terminals. The inhibiting function, together with that effected on the reset terminal by AND gate 79, prevent any confusion in the operation of the start circuit 63. Similar provisions are made for the direction circuit 64, as will appear from the later discussion.

The direction circuit 64 always remains in the condition determined by the last transition. In this respect, direction circuit 64 performs a storage function. If the last transition was a transition to white, the direction circuit is initially in the set state and the address bit is steered through an AND gate 74 to reset the direction circuit 64. AND gate 74 is enabled under these conditions by the negative output voltage applied to a second input terminal from the "0" output terminal of the direction circuit 64 when it is set.

In line *c* of FIG. 11, three illustrative transition code words are shown. As stated above, after each address bit the start circuit 63 is placed in the set condition. In addition, the direction circuit 64 is reset if in the set condition due to the last transition being to white. The resetting of the direction circuit 64 and the setting of the start circuit 63 enable AND gate 76 so that it can transmit received input pulses as the second bit of a transition code word. Toward this end, AND gate 76 has three input terminals. A first is connected to the "1" output terminal of direction circuit 64 at which a negative output voltage is present when the direction circuit 64 is in the reset condition. A second input terminal of AND gate 76 receives a negative output voltage from the "0" output terminal of start circuit 63 when that circuit is in the set condition. Thus, after the reception of an address bit, AND gate 76 is enabled. A third input terminal of AND gate 76 is connected to the output terminal of AND gate 70. The output terminal of AND gate 76 is connected to the set terminal of timing circuit 65. As a result, any pulse present as the second bit of the three bit transition code word causes AND gate 76 to produce an output signal which causes the timing circuit 65 to be placed in the set condition.

The first transition code word shown in line *c* of FIG. 11 represents a late transition to white. Of course, when a late transition has occurred, the second bit of the three bit transition is a space (0) and no pulse appears in the output of gate 70. Consequently, the timing circuit 65, which is initially reset, remains reset because AND gate 76 produces no output signal.

The $\varphi_M$ pulse generated by digit generator 71 during the second bit of the three bit transition code word is used to set direction circuit 64. To accomplish this, AND gate 77, whose output is connected to the set terminal of direction circuit 64, is connected to receive at one of its input terminals the $\varphi_M$ pulses. In addition, AND gate 77 has a second input terminal connected to receive signals present at the "1" output terminal of direction circuit 64 and a third input terminal connected to receive output signals from the "0" output terminal of start circuit 63. Since the direction circuit 64 is in the reset condition and the start circuit 63 is in the set condition, upon the occurrence of the leading edge of the second $\varphi_M$ pulse shown in line *a* of FIG. 11, the direction circuit 64 is placed in the set condition at that time. Thus, the start 63 and direction 64 circuits are now both in the set state. The first transition code word shown in line *c* of FIG. 11 represents a transition to white and as a result the third bit of the transition code word will be a space (0). As a result, AND gate 74 produces no output signal and the direction circuit 64 remains in the set state.

The sequence of events continues with the $\varphi_M$ pulse appearing simultaneously with the third bit of the three bit transition code word causing an AND gate 79 to produce a signal at the reset terminal of start circuit 63. AND gate 79 is enabled by negative voltages; one from the "0" output terminal of start circuit 63, and a second from the "0" output terminal of direction 64. The AND gate 79 is thus enabled when the direction circuit 64 and the start circuit 63 are both set to permit the reset of start circuit 63 by the $\varphi_M$ pulse.

Since the timing circuit 65 is also in the reset condition, no further action takes place until the occurrence of the fourth $\varphi_M$ pulse shown in line *a* of FIG. 11. At this time OR gate 80 is caused to produce an output signal which is applied to the set input terminal of read circuit 66 to set the read circuit producing an output signal at the "1" output terminal indicative of a white level. This is accomplished by enabling AND gate 82 under the existing conditions wherein the direction circuit 64 is in the set condition and the start circuit 63 is in the reset condition which corresponds to the conditions existing upon the occurrence of the leading edge of the fourth $\varphi_M$ pulse shown in line *a* of FIG. 11. At this time AND gate 82 is enabled and conducts this fourth $\varphi_M$ pulse which is transmitted through OR gate 80 to set read circuit 66.

Because the first transition shown in line *c* was a late transition, the read circuit 66 made no transition until one time interval after the direction digit of the three bit code word had been received. Had the transition been an early one, the read circuit 66 would have made its transition one-half time interval earlier. As a result, in accordance with this invention, the transitions of the two level transmitted signal are quantized to within one-half the time interval between the time slots allocated to the transmission of these signals without the necessity of doubling the sampling rate.

The third transition illustrated in FIG. 11 is an early transition to white. The sequence of events previously described for a late white transition differs from an early white transition in that when AND gate 76 is enabled upon the reception of an address bit, it now produces an output signal upon the occurrence of a timing pulse in the second bit of the transition code word to set the timing circuit 65. As before, the start circuit 63 is reset upon the occurrence of the directional bit of the three bit transition code word. Since the "1" output terminal of start circuit 63 is connected to one input terminal of an AND gate 85, AND gate 85 is enabled and upon the occurrence of the next $\varphi_T$ pulse, namely, that numbered "9" in line *b* of FIG. 11, AND gate 85 which is connected to receive $\varphi_T$ marking pulses from generator 71 produces an output signal which resets the timing circuit 65. The resetting output signal at the "1" terminal of timing circuit 65 is differentiated by a differentiator circuit 86 whose output is applied to one input terminal of an AND gate 87. The second input terminal of AND gate 87 is connected to receive the output signals from the "0" terminal of the direction circuit 64. At the time of the occurrence of the ninth $\varphi_T$ pulse shown in line *b* of FIG. 11, the direction circuit 64 is in the set condition. AND gate 87 therefore produces an output signal which is transmitted through OR gate 80 and sets the read circuit 66 upon the occurrence of the ninth $\varphi_T$ pulse.

Thus, for an early transition the read circuit 66 makes a corresponding transition one-half time interval after the occurrence of the directional bit of the transition code word. The resulting quantization to no more than one-half time interval reduces the time quantization error between the input signal to the transmitter and the output signal from the receiver without the necessity of doubling the number of time slots allocated to the transmission of the two level signals.

The second transition shown in line *c* of FIG. 11 is an early transition to black, and the read circuit 66 should be reset one-half time interval after the occurrence of the directional bit. As before, the address or transition bit immediately sets the start circuit 63 and since the direction circuit 64 is in the set state, due to the previous transition being to white, the address bit is also steered through AND gate 74 to reset the direction circuit 64. The resetting of the direction circuit 64 enables AND gate 76, as previously explained, and the output of AND gate 76 causes the timing circuit 65 to assume its set condition upon occurrence of the leading edge of the timing bit of the transition code word. In addition, the $\varphi_M$ pulse occurring simultaneously with the timing digit is transmitted through AND gate 77 to set the direction circuit 64.

The start circuit 63 and the direction circuit 64 are now both in the set state. Since the transition is to black, the directional bit resets the direction circuit 64 by enabling AND gate 74. At the same time, namely, during the directional bit, a $\varphi_M$ pulse from generator 71 causes AND gate 79 to generate an output signal to reset the start circuit 63. The next $\varphi_T$ pulse after the directional bit causes AND gate 85 to produce an output signal to reset the timing circuit 65, and the output signal appearing at the "1" output terminal of timing circuit 65 is differentiated by differentiator circuit 90 and applied to one input terminal of an AND gate 91. AND gate 91 has a second input terminal connected to the "1" output terminal of the direction circuit 64 which is in the reset condition so that the differentiated output signal from the timing circuit 65 causes AND gate 91 to generate an output signal which is transmitted through OR gate 92 to reset the read circuit 66 one-half time interval after the directional bit. This corresponds to an early transition to black.

When a late transition to black occurs, then the timing circuit 65 remains in the set condition so that a $\varphi_T$ pulse occurring one-half time interval after the directional bit cannot reset the timing circuit 65 and there will be no signal generated to reset the read circuit 66 at this time. A $\varphi_M$ pulse occurring one-half time interval later, however, will render an AND gate 95 conductive since AND gate 95 is enabled by the negative step output voltage at the "1" output terminal of start circuit 63 and a similar voltage at the "1" output terminal of direction circuit 64. The output terminal of AND gate 95 is connected through OR gate 92 to the reset input terminal of read circuit 66 so that one time interval after the directional bit of a transition code word indicating a late transition to black, the read circuit 66 is reset.

Thus, in accordance with this invention, serial data signals are transmitted over a digital transmission system wherein each transmission in the input signal is encoded into a three bit transition code word with the first bit acting as a transition bit to signal to the receiving terminal that a transition has taken place, the second bit acting as a timing digit to reduce the so-called time quantization error between transmitted and received signals and the third bit acting as a directional bit to signal the direction of transition. As a result, the maximum time quantization error between transmitted and received signals is limited to one-half the time interval between time slots allocated to the transmission of such serial data and this results in a substantial reduction in distortion of the transmitted signal.

It is to be understood that the above-described arrangements are illustrative of the application of the principles of the invention. Numerous other arrangements may be devised by those skilled in the art without departing from the spirit and scope of the invention.

What is claimed is:

1. A coder for generating code words of three binary pulses descriptive of a two level signal comprising means for normally sampling said two level signal at a rate twice the pulse repetition rate of said binary pulses, means for storing the sampled signal level, means for producing a first pulse of the code word in response to a change in the stored level, means responsive to a change in the stored level for inhibiting operation of the sampling means for at least four samplings, means for determining the characteristic of the second pulse of the code word in accordance with the occurrence of a change in stored level on the respective odd or even samplings, and means for determining the characteristic of the third pulse of the code word in accordance with the stored level.

2. A coder for generating code words of three binary pulses descriptive of a two level signal in which the first or address pulse identifies a transition in said signal, the second pulse identifies in which of two adjacent sampling times the transition occurred, and the third pulse identifies the direction of the transition comprising, a source of clock pulses of repetition rate equal to the rate of transmission of the pulses of said code word, means for normally examining the two level signal at twice the repetition rate of the clock pulses, means for storing the sampled signal level, means for determining a transition in the stored level and producing an indication of which of two adjacent sampling pulses detected the transition, a gating circuit for determining the three binary pulses of the code words, a stop-start counter for determining three time periods synchronized with the clock pulses and corresponding respectively to said three binary pulses, means responsive to the transition determining means for starting said counter, means responsive to the start of the counter for controlling said gating circuit to produce the address pulse of said code word, means responsive to said transition determining means for controlling said gating circuit to produce a second pulse of the code word of a character determined by which of the two sampling pulses detected the transition, means responsive to storing means for controlling said gating circuit to produce the third pulse of said code word of a character determined by the stored signal level, and means for inhibiting the sampling of the two level signal during the first two periods of said counter.

3. Apparatus to generate a two level signal in response to the reception of characters of three binary digits wherein the characteristic of a first digit determines the appearance or nonappearance of a transition in the signal, the characteristic of the second digit determines the time of occurrence of the transition of the signal and the characteristic of the third digit determines the direction of the transition comprising, in combination, signal generating means to generate a two level signal, means responsive to the reception of said first and said second binary digits to ascertain the time of transition in said signal, and means responsive to said means which ascertains the time of transition and the reception of said third digit of said receiving character to set the two level signal generating means to the level determined by said third digit at a time ascertained in accordance with the characteristic of said second binary digit.

4. Apparatus to generate a two level signal in response to the reception of characters of three binary pulses wherein the characteristic of the first digit determines the appearance or nonappearance of a transition in the signal, the characteristic of the second digit determines the time of occurrence of the transition of the signal and the characteristic of the third digit determines the direction of the transition comprising, in combination, signal generating means to generate a two level signal, means to generate timing pulses at twice the pulse repetition rate at which the binary pulses are received, means responsive to the reception of said first and said second binary digits of each received character to ascertain if a transition occurred in the time interval between an odd numbered timing pulse and the immediately succeeding even numbered timing pulse, means responsive to the reception of said first and second binary digits to ascertain if a transition occurred between an even numbered timing pulse and the immediately succeeding odd numbered timing pulse, and means responsive to said means which ascertain the time of transition relative to said odd and even numbered timing pulses and to the reception of said third digit of said received character to set the two level signal generating means to the level determined by said third digit at a time ascertained in accordance with the characteristic of said second binary digit.

5. Apparatus in accordance with claim 4 wherein said signal generating means to generate a two level signal, said means to ascertain the time of transition and said means to set the two level signal generating means to the level determined by said third digit at a time ascertained in accordance with the characteristic of said second binary digit comprises, in combination, a bistable circuit having set and reset input terminals and an output terminal, a counter comprising a second and third bistable circuits, a fourth bistable circuit, means to set the second bistable circuit and reset the third bistable circuit in response to the reception of a mark in the first bit of a received character, means to set the fourth bistable circuit in response to the reception of a mark in the second bit of the three bit transition code word one time interval after said second bistable circuit is set, means to set the said third bistable circuit at the time of occurrence of the second bit of said transition code word, and means responsive to the states of said second, third and fourth bistable circuits to trigger said first bistable circuit to the proper level in accordance with the signal received during the third bit of the transition code word at a time determined by the received bit in said second transition code word.

6. A system for transmitting a two level signal by characters of three binary digits comprising, means for determining the characteristic of the first digit in accordance with the appearance or nonappearance of a transition in said signal, means for determining the characteristic of the second digit with respect to that one of two adjacent sampling instants in which the transition occurred, and means for determining the characteristic of the third digit with respect to the direction of a transition in said signal.

No references cited.

ROBERT L. GRIFFIN, *Primary Examiner.*

J. T. STRATMAN, *Assistant Examiner.*